United States Patent
Zhou (10) Patent No.: US 10,282,138 B2
(45) Date of Patent: May 7, 2019

(54) SECONDARY READ CACHE OPTIMIZATION IN DATA REPLICATION ENVIRONMENTS

(71) Applicant: International Business Machines Corporation, Armonk, NY (US)

(72) Inventor: Xue Qiang Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 15/277,205

(22) Filed: Sep. 27, 2016

(65) Prior Publication Data

US 2018/0088837 A1   Mar. 29, 2018

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |
| *G06F 11/14* | (2006.01) |
| G06F 12/0868 | (2016.01) |
| G06F 12/084 | (2016.01) |

(52) U.S. Cl.
CPC .............. *G06F 3/067* (2013.01); *G06F 3/065* (2013.01); *G06F 3/0614* (2013.01); *G06F 11/14* (2013.01); *G06F 3/0619* (2013.01); *G06F 12/084* (2013.01); *G06F 12/0868* (2013.01)

(58) Field of Classification Search
CPC ... G06F 2/0619; G06F 12/084; G06F 12/0868
USPC ........................................................ 711/123
See application file for complete search history.

(56) References Cited

U.S. PATENT DOCUMENTS

| | | |
|---|---|---|
| 7,877,628 B2 | 1/2011 | Boyd et al. |
| 8,010,758 B1 | 8/2011 | Bezbaruah et al. |
| 8,185,663 B2 | 5/2012 | Cochran et al. |
| 9,020,895 B1 | 4/2015 | Rajashekar et al. |
| 9,110,837 B2 | 8/2015 | Patel et al. |

(Continued)

OTHER PUBLICATIONS

Kumar, Latesh, et al. "Novel Approach: Clustered Cache Parallel NFS and Implementing Across Wide Area Network: Disaster Recovery Centers," Proc. of Int. Conf. on Advances in Communication, Network, and Computing, CNC, Feb. 2014.

*Primary Examiner* — Edward J Dudek, Jr.
*Assistant Examiner* — Sidney Li
(74) *Attorney, Agent, or Firm* — Nelson and Nelson; Daniel P. Nelson; Alexis V. Nelson (57) ABSTRACT

A method to optimize primary and secondary read cache in a data replication environment includes determining contents of a primary read cache at a primary site. The method updates a primary cache map describing the contents and transmits the primary cache map from the primary site to a secondary site. At the secondary site, the method uses the primary cache map to substantially synchronize a secondary read cache with the primary read cache. The method further monitors for updates to the primary read cache and updates the primary cache map accordingly. When a difference between a current primary cache map and a previously transmitted primary cache map reaches a threshold, the method transmits the current primary cache map from the primary site to the secondary site. A corresponding system and computer program product are also disclosed.

20 Claims, 9 Drawing Sheets

(56) References Cited

U.S. PATENT DOCUMENTS

2003/0229764 A1* 12/2003 Ohno ............... G06F 3/061
                                                711/147
2016/0134695 A1* 5/2016 Liang ............. H04L 67/1095
                                                709/223

* cited by examiner

SECONDARY READ CACHE OPTIMIZATION IN DATA REPLICATION ENVIRONMENTS

BACKGROUND

Field of the Invention

This invention relates to systems and methods for optimizing read cache in data replication environments.

Background of the Invention

In data replication environments such as Peer-to-Peer-Remote-Copy ("PPRC") environments, data is mirrored from a primary storage device to a secondary storage device to maintain two identical copies of the data. The primary and secondary storage devices may be located up to several hundred kilometers from one another. In the event the primary storage device fails, I/O may be redirected to the secondary storage device, thereby enabling continuous data availability. When the primary storage device is repaired, I/O may be redirected back to the primary storage device. The process of redirecting I/O from the primary storage device to the secondary storage device when a failure or other event occurs may be referred to as a HyperSwap.

HyperSwap is a function provided by IBM's z/OS operating system that provides continuous availability in the case of disk failures by maintaining synchronous copies of primary disk volumes on one or more secondary storage controllers. When a disk failure is detected at a primary site, a host system running the z/OS operating system identifies HyperSwap managed volumes. Instead of rejecting I/O requests, the host system uses the HyperSwap function to switch (or swap) information in internal control blocks so that I/O requests are driven against synchronous copies at the secondary site. Since the secondary volumes are identical copies of the primary volumes prior to the failure, the I/O requests will ideally succeed with minimal impact (i.e., delay in I/O response times) on the issuing applications. Unfortunately, although secondary volumes may contain identical copies of data in the primary volumes, the control unit cache at the secondary site may not be populated with the same data as the control unit cache at the primary site. This is because read requests are only executed at the primary control unit. This may cause a decrease in performance after swapping from primary volumes to secondary volumes, at least until cache at the secondary site can be fully populated with data most recently in use by applications.

In view of the foregoing, what are needed are systems and methods to optimize read cache at a secondary site. Ideally, such systems and methods will ensure that, after a swap has occurred, I/O performance at a secondary site will match as much as possible I/O performance at a primary site.

SUMMARY

The invention has been developed in response to the present state of the art and, in particular, in response to the problems and needs in the art that have not yet been fully solved by currently available systems and methods. Accordingly, the invention has been developed to provide systems and methods to optimize primary and secondary read cache in a data replication environment. The features and advantages of the invention will become more fully apparent from the following description and appended claims, or may be learned by practice of the invention as set forth hereinafter.

Consistent with the foregoing, a method to optimize primary and secondary read cache in a data replication environment is disclosed. In one embodiment, such a method includes determining contents of a primary read cache at a primary site. The method updates a primary cache map describing the contents and transmits the primary cache map from the primary site to a secondary site. At the secondary site, the method uses the primary cache map to substantially synchronize a secondary read cache with the primary read cache. The method further monitors for updates to the primary read cache and updates the primary cache map accordingly. When a difference between a current primary cache map and a previously transmitted primary cache map reaches a threshold, the method transmits the current primary cache map from the primary site to the secondary site.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

Figure 1:
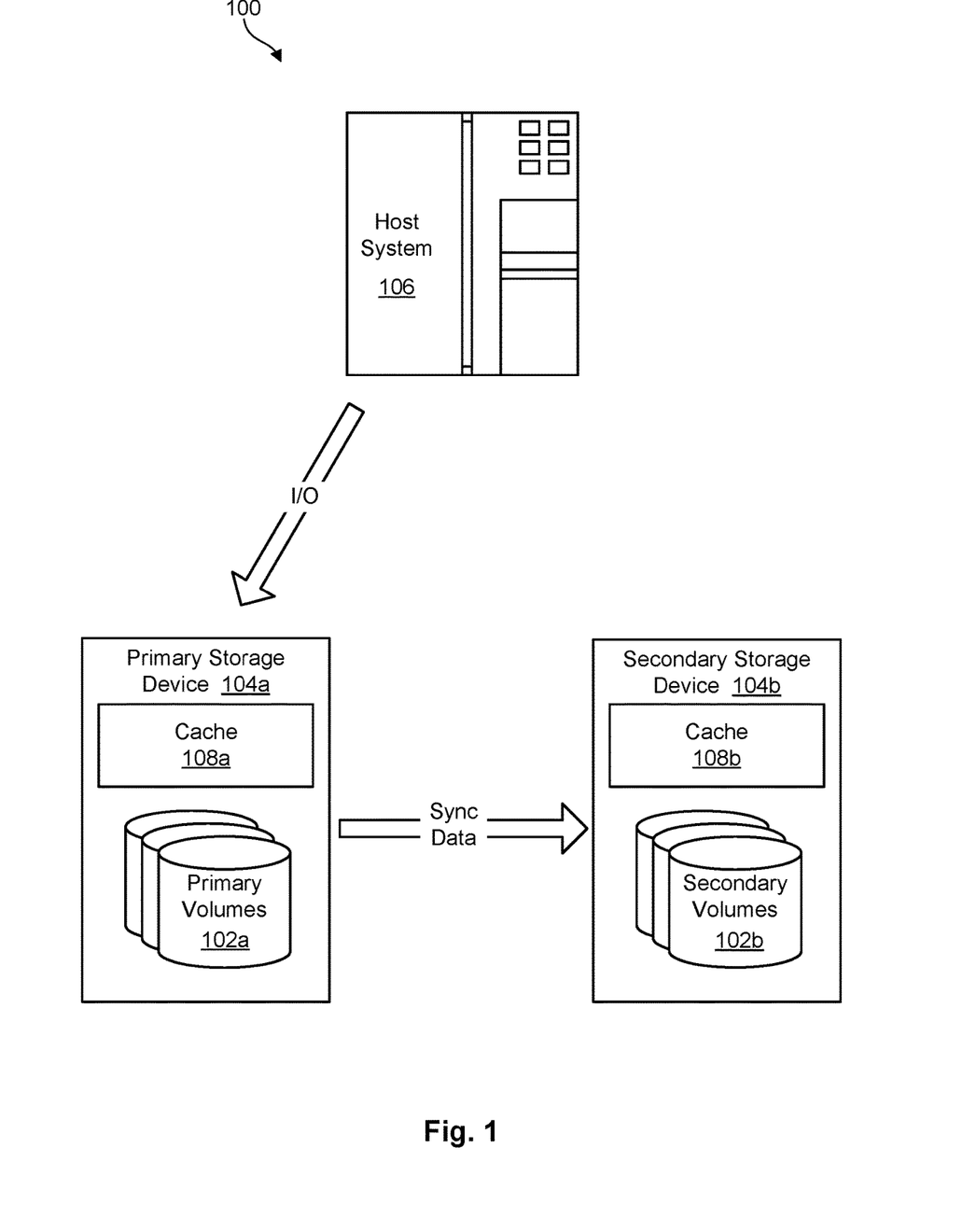
FIG. 1 is a high-level block diagram showing one example of a data replication environment, in this example a Peer-to-Peer-Remote-Copy ("PPRC") environment.

Referring to FIG. 1, one example of a data replication system 100, in this embodiment a PPRC system 100, is illustrated. The PPRC system 100 is presented to show an example of an architecture in which embodiments of the invention may operate, and is not intended to be limiting. In general, the PPRC system 100 establishes a mirroring relationship between one or more primary volumes 102a and one or more secondary volumes 102b. Once this relationship is established, a consistent copy of data is maintained on the volumes 102a, 102b. The primary and secondary volumes 102a, 102b may be located on the same storage device 104, although the volumes 102a, 102b are typically located on separate storage devices 104a, 104b located some distance (e.g., several miles to thousands of miles) from one another. In certain embodiments, the storage devices 104a, 104b have similar, if not identical, hardware. Channel extension equipment may be located between the storage devices 104a, 104b, as needed, to extend the distance over which the storage devices 104a, 104b may communicate.

The data replication system 100 may, in certain embodiments, be configured to operate in either a synchronous or asynchronous manner. For example, referring to FIG. 3, while continuing to refer generally to FIG. 1, when operating synchronously, an I/O may only be considered complete when it has completed successfully on both the primary and secondary storage devices 104a, 104b. As an example, in such a configuration, a host system 106 may initially send a write request 300 to the primary storage device 104a. This write operation may be performed on the primary storage device 104a. The primary storage device 104a may, in turn, transmit a write request 302 to the secondary storage device 104b. The secondary storage device 104b may execute the write operation and return a write acknowledge signal 304 to the primary storage device 104a. Once the write has been performed on both the primary and secondary storage devices 104a, 104b, the primary storage device 104a returns a write acknowledge signal 306 to the host system 106. The I/O is only considered complete when the host 106 receives the write acknowledge signal.

Figure 3:
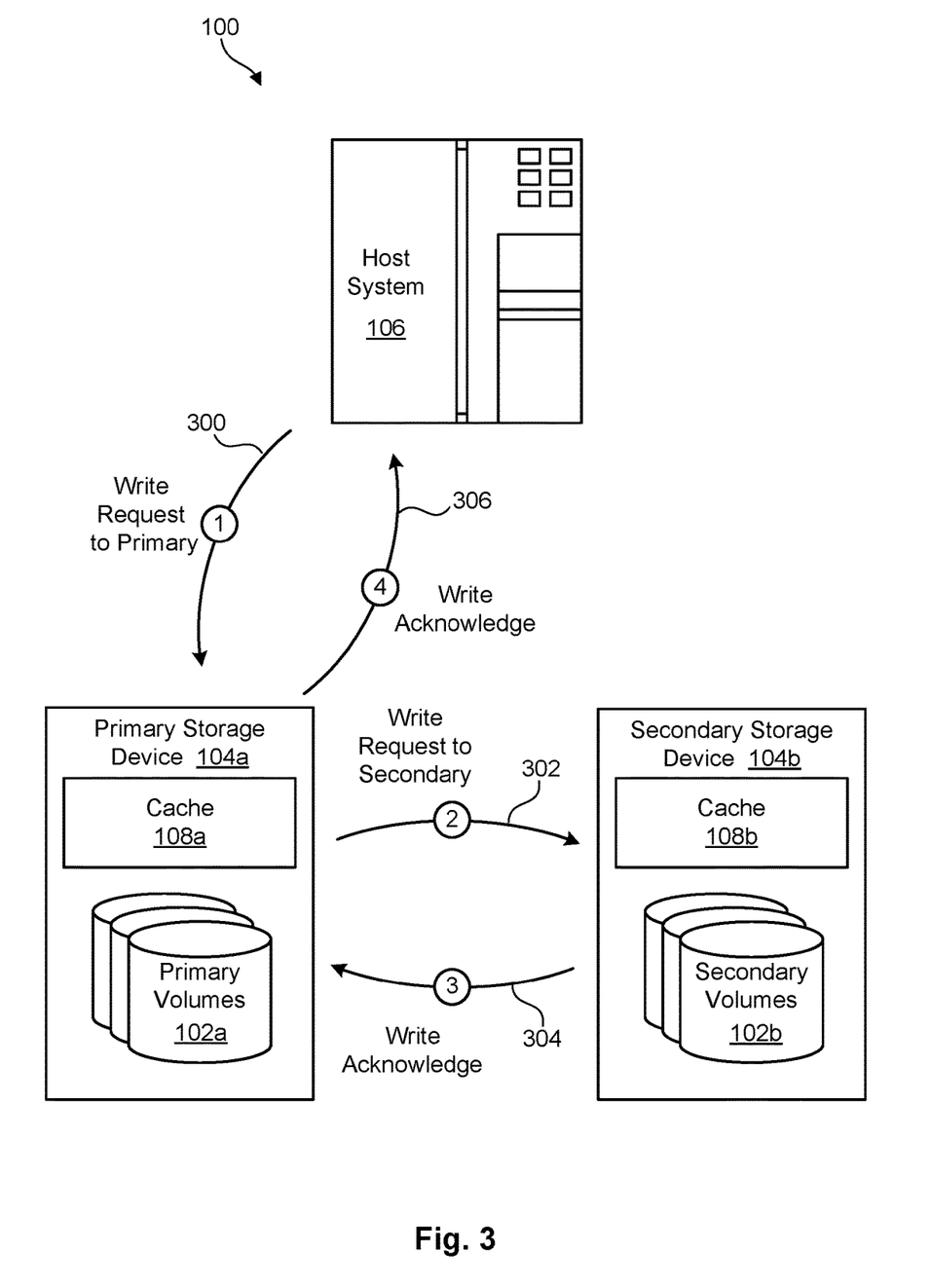
FIG. 3 is a high-level block diagram showing processing of a write request in the system of FIG. 1.

By contrast, asynchronous operation may only require that the write complete on the primary storage device 104a before the write is considered complete. That is, a write acknowledgement may be returned to the host system 106 when the write has completed on the primary storage device 104a, without requiring that the write also be completed on the secondary storage device 104b. The write may then be mirrored to the secondary storage device 104b as time and resources allow to create a consistent copy on the secondary storage device 104b.

Referring again to FIG. 1, as shown, each of the primary storage device 104a and secondary storage device 104b may include cache 108a, 108b. Whenever a storage device 104 receives a read request from a host system 106, the storage device 104 may first check its cache 108 to determine whether the requested data is stored therein. If so, the storage device 104 may retrieve the data from its cache 108 and return it to the host system 106. If the data is not stored in its cache 108, the storage device 104 may fetch the data from its volumes 102 (typically disk and/or solid state drives), return the data to the host system 106, and save it in its cache 108 in the event it is requested again. This process is typically much slower than direct retrieval from cache 108. If the data is requested again by a host 106, the storage device 104 may fetch the data from its cache 108 instead of fetching it from its volumes 102, saving both time and resources.

In a similar manner, when a storage device 104 receives a write request, the storage device 104 may store the write in its cache 108 and destage the write to its volumes 102 at a later time. The write may be considered complete when it is written to its cache 108 as opposed to when it is destaged to its volumes 102. In general, the cache 108 may accelerate reads and writes and generally enhance I/O performance.

Figure 2:
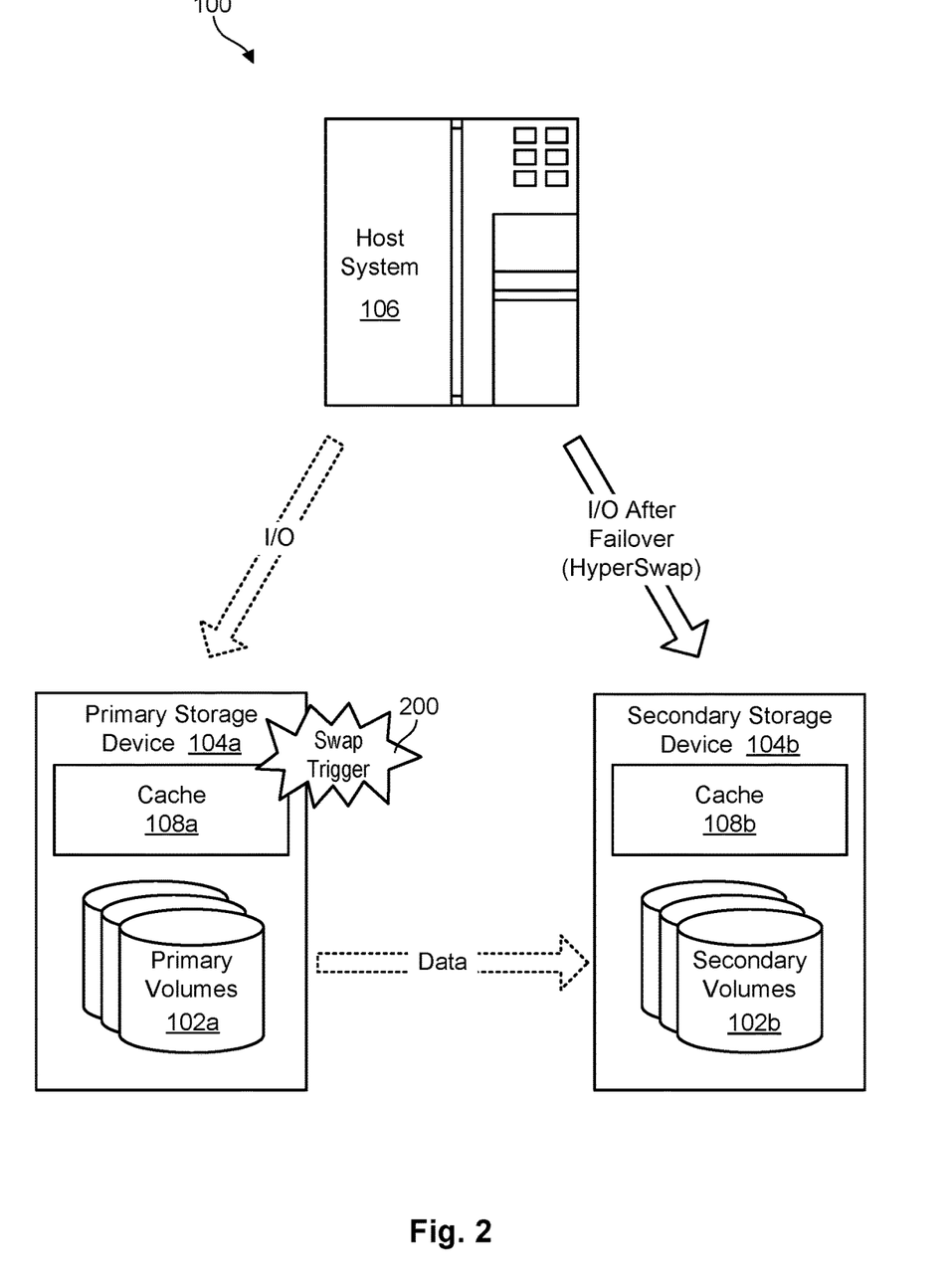
FIG. 2 is a high-level block diagram showing behavior of the system of FIG. 1 after a swap trigger.

Referring to FIG. 2, in the event the primary storage device 104a fails, I/O may be redirected to the secondary storage device 104b, thereby enabling continuous operations. This process may be referred to as a swap or HyperSwap. Since the secondary storage device 104b contains a consistent copy of the data on the primary storage device 104a, the redirected I/O (e.g., reads and writes) may be performed on the copy of the data on the secondary storage device 104b. When the primary storage device 104a is repaired or resumes operation, mirroring may be restarted in the opposite direction to make device 104b the new primary storage device and device 104a the new secondary storage device. Alternatively, I/O may be resumed to the primary storage device 104a after it has been updated with data from the secondary storage device 104b, while data mirroring may be resumed to the secondary storage device 104b.

Although the systems and methods disclosed herein will be discussed primarily in association with PPRC systems, the systems and methods may also be applicable, in various forms, to other analogous data replication technologies, regardless of the manufacturer, product name, or components or component names associated with the technology. Any data replication technology that could benefit from one or more embodiments of the invention is, therefore, deemed to fall within the scope of the invention.

As previously mentioned, HyperSwap is a function provided by IBM's z/OS operating system that provides continuous availability for disk failures by maintaining synchronous copies of data on primary disk volumes 102a on secondary disk volumes 102b. When a disk failure is detected at a primary site 104a, a host system 106 running the z/OS operating system identifies HyperSwap-managed volumes 102a at the primary site 104a. Instead of rejecting I/O requests, the host system 106 uses the HyperSwap function to switch (or swap) information in internal control blocks so that I/O requests are driven against synchronous copies at the secondary site 104b, as shown in FIG. 2. Such an operation may also be referred to as a "failover." Since the secondary volumes 102b contain identical copies of data in the primary volumes 102a prior to the failure, the I/O requests will ideally succeed with minimal (i.e. a slight delay in I/O response time) impact on the issuing applications. This functionality masks disk failures from applications and ideally avoids application or system outages. An event which initiates a HyperSwap may be referred to as a "swap trigger" 200.

Figure 4:
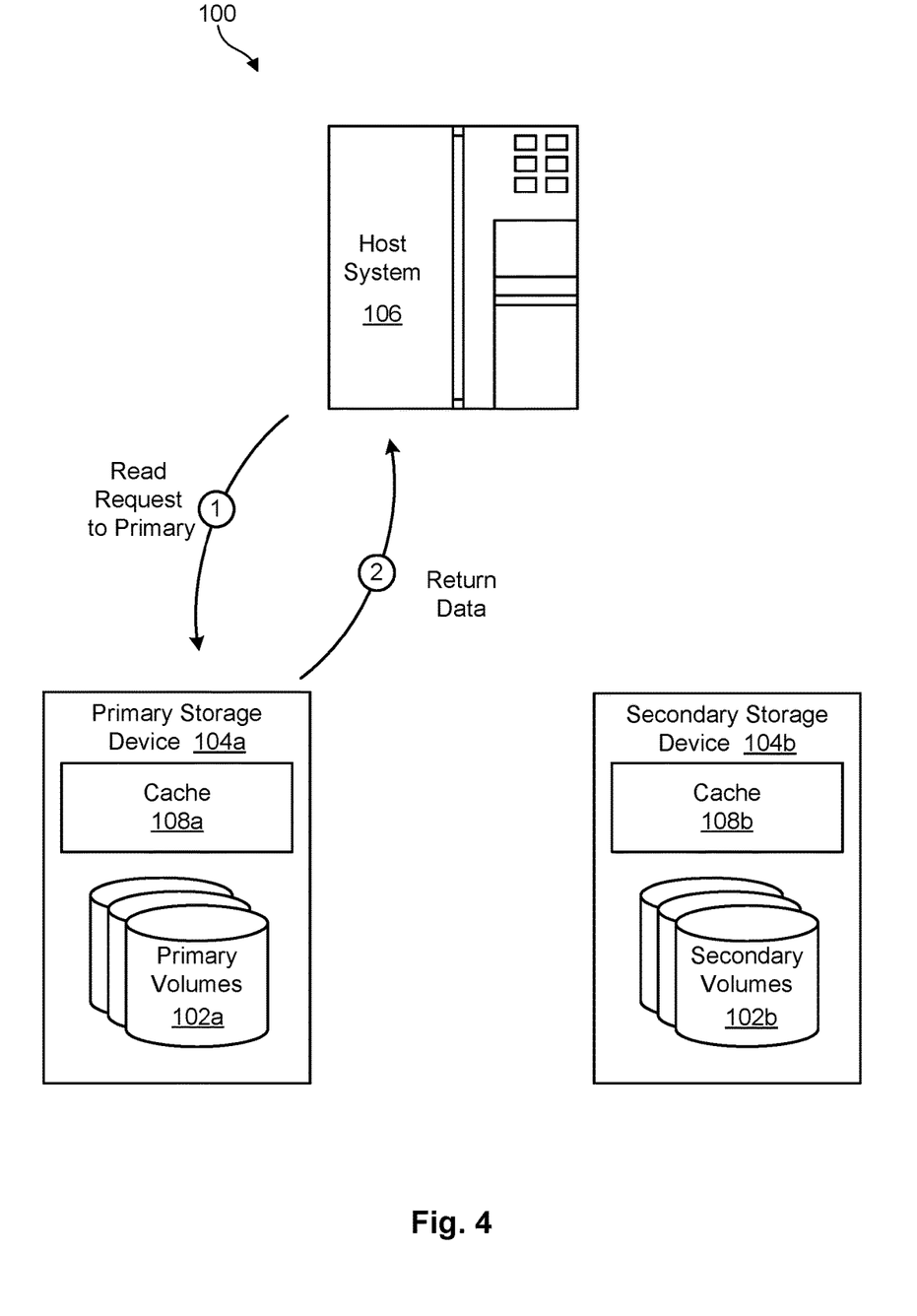
FIG. 4 is a high-level block diagram showing processing of a read request in the system of FIG. 1.

Referring to FIGS. 3 and 4, unfortunately, in conventional PPRC systems 100, I/O performance before and after a HyperSwap event may not be equivalent. This may be in large part due to the way that cache 108 is populated in conventional PRRC systems. For example, as shown in FIG. 3, during normal PPRC operation, writes may be mirrored from the primary storage device 104a to the secondary storage device 104b. This allows the writes to be cached not only in the cache 108a of the primary storage device 104a, but also in the cache 108b of the secondary storage device 104b. However, as shown in FIG. 4, reads may be performed exclusively at the primary storage device 104a since no data is modified and thus there is no need to replicate changes to the secondary storage device 104b. Because read requests are typically not propagated to the secondary storage device 104b, cache 108b at the secondary storage device 104b may not be populated with reads in the same way as cache 108a at the primary storage device 104a. The data that is stored in each cache 108a, 108b may vary significantly, particularly in PPRC systems 100 with high read workloads.

The result of this variation may be evident when a HyperSwap event occurs. In particular, I/O performance may decrease when I/O is redirected to the secondary storage device 104b since the cache 108b at the secondary site is not populated with the same data as cache 108a at the primary site. The I/O performance may remain impaired until the cache 108b at the secondary site can be populated to reflect the actual read and write workload originating from the host system 106. The cache 108b at the secondary storage device 104b may gradually be populated as read and write requests are received from the host system 106, but may nevertheless result in decreased I/O performance in the interim, which may be on the order of hours or days.

Figure 5:
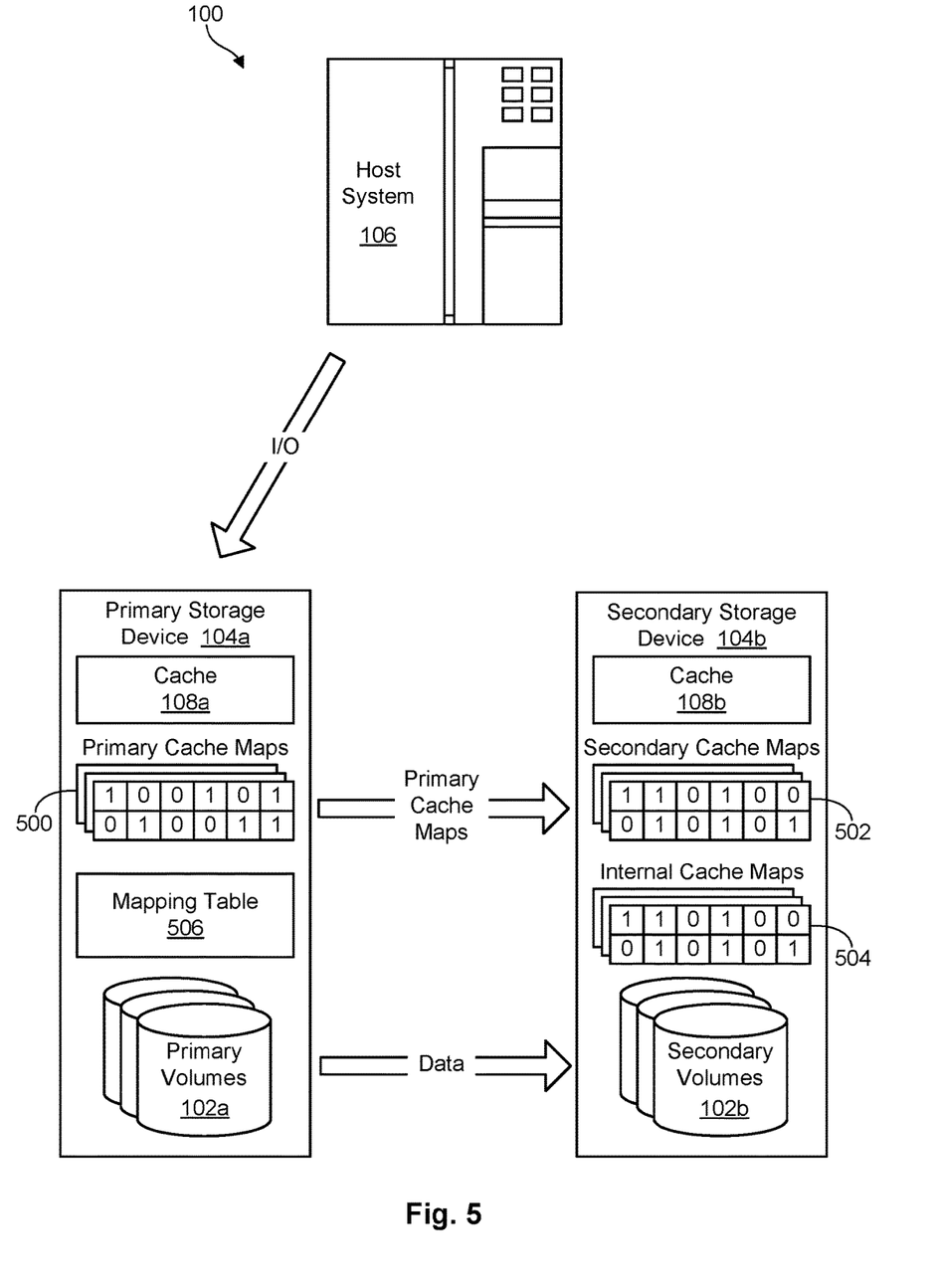
FIG. 5 is a high-level block diagram showing a system and methodology for substantially synchronizing a secondary read cache with a primary read cache.

Referring to FIG. 5, in order to address the deficiencies identified above, systems and methods in accordance with the invention may provide functionality to ensure that cache 108a, 108b at the primary and secondary sites are substantially synchronized. As shown in FIG. 5, in certain embodiments, various cache maps 500, 502, 504 may be maintained at the primary site and secondary site to keep the primary cache 108a and secondary cache 108b substantially synchronized with one another. In particular, primary cache maps 500 may be maintained at a primary storage device 104a, and secondary cache maps 502 and secondary internal cache maps 504 may be maintained at a secondary storage device 104b. In the illustrated embodiment, a primary cache map 500 is maintained for each primary volume 102a on the primary storage device 104a, and a secondary cache map 502 and secondary internal cache map 504 is maintained for each secondary volume 102b on the secondary storage device 104b. To track mirroring relationships between volumes 102a at the primary site and volumes 102b at the secondary site, a mapping table 506 may be provided that provides mappings between the volumes 102a, 102b. The cache maps 500, 502, 504 may be maintained at the volume level since this is the unit of storage space used by many data replication systems 100 to mirror data from a primary site to a secondary site. Nevertheless, in other embodiments, cache maps 500, 502, 504 may be maintained for units of data other than volumes.

In general, the primary cache maps 500 may be used to track the contents of the primary cache 108a at the primary site, and the secondary cache maps 502 may be used to track the contents of the secondary cache 108b at the secondary site. In certain embodiments, each primary cache map 500 includes a bit for each track in its corresponding primary volume 102a, and each secondary cache map 502 includes a bit for each track in its corresponding secondary volume 102b. The bits may be set if the corresponding tracks are contained in cache 108 and reset if they are not contained in cache 108, or vice versa.

As the contents of the primary cache 108a change in response to reads and/or writes to the primary storage device 104a, the primary cache maps 500 may be updated to reflect these changes. These primary cache maps 500 may be periodically transmitted to the secondary storage device 104b so that the secondary storage device 104b can substantially synchronize its secondary cache 108b with the primary cache 108a. In certain embodiments, a current primary cache map 500 may be transmitted from the primary site to the secondary site when a difference between the current primary cache map 500 and a previously transmitted primary cache map 500 reaches a threshold. This threshold may be expressed as a percentage that the primary cache map 500 has changed since it was previously transmitted, a number of updates that have occurred to the primary cache map 500 since the last time it was transmitted, and/or the like.

At the secondary storage device 104b, the secondary cache maps 502 may be sued to keep track of which tracks are cached in the secondary cache 108b. When a new primary cache map 500 is received by the secondary storage device 104b from the primary storage device 104a, the primary cache map 500 may be compared to the corresponding secondary cache map 502 to determine which tracks are in the primary cache 108a but not the secondary cache 108b. This may also determine which tracks are in the secondary cache 108b but not the primary cache 108a so that these tracks may be dismissed (e.g., evicted or destaged) from the secondary cache 108b.

In certain cases, the secondary cache 108b may contain tracks that are not in the primary cache 108a but nevertheless need to (or would be desired to) remain in the secondary cache 108b. For example, the secondary storage device 104b may have internal reads or writes that may populate the secondary cache 108b. Although these reads and/or writes may not be reflected in the primary cache 108a, it may nevertheless be desired to maintain these entries in cache 108b at the secondary site to support the internal operations of the secondary storage device 104b. To prevent this data from being dismissed from the secondary cache 108b when synchronizing the secondary cache 108b with the primary cache 108a, secondary internal cache maps 504 may be provided. In certain embodiments, a secondary internal cache map 504 may be maintained for each secondary volume 102b. These secondary internal cache maps 504 may indicate which tracks of the secondary volumes 102b are stored in the secondary cache 108b for internal or other operations of the secondary storage device 104b.

Figure 6:
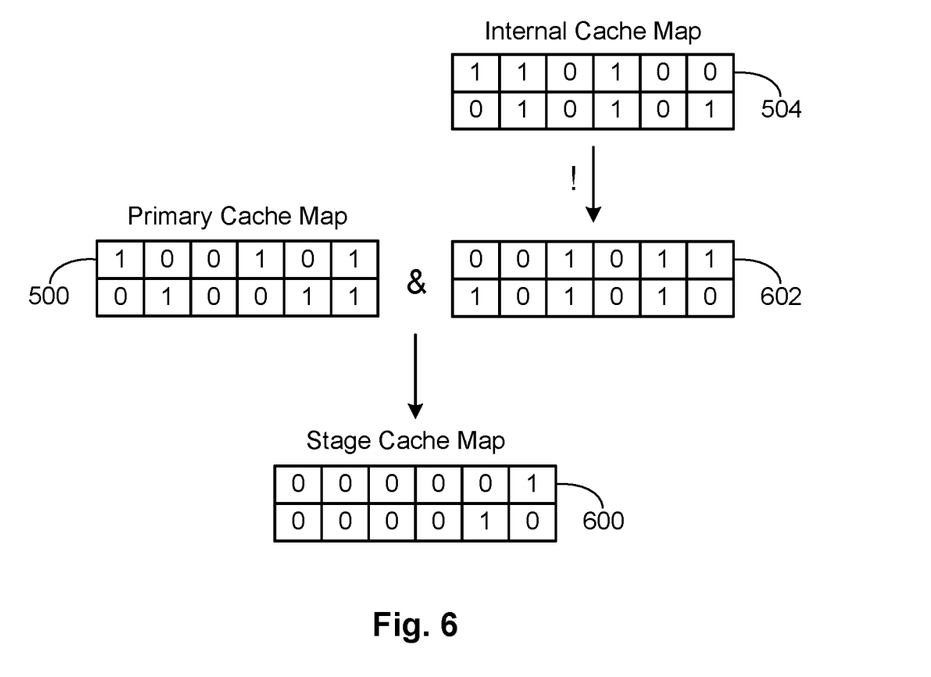
FIG. 6 is a high-level block diagram showing calculation of a stage cache map for initializing a secondary read cache.

Referring to FIG. 6, a high-level block diagram showing calculation of a stage cache map 600 for initializing a secondary cache 108b is illustrated. The stage cache map 600, as its name implies, may be used to indicate which tracks need to be staged from the corresponding secondary volume 102b to the secondary cache 108b. As shown, upon receiving the primary cache map 500 from the primary storage device 104a, the secondary storage device 104b may AND the primary cache map 500 with the inverse of the secondary internal cache map 504 to yield the stage cache map 600. The secondary cache 108b may then be populated with tracks indicated by the stage cache map 600. Because it is partially derived from the secondary internal cache map 504, the stage cache map 600 takes into account tracks that are already in the secondary cache 108b so that these tracks are not staged from the corresponding secondary volume 102b. Once the secondary cache 108b is populated, the secondary cache map 502 is updated to reflect the contents of the secondary cache 108b.

Figure 7A:
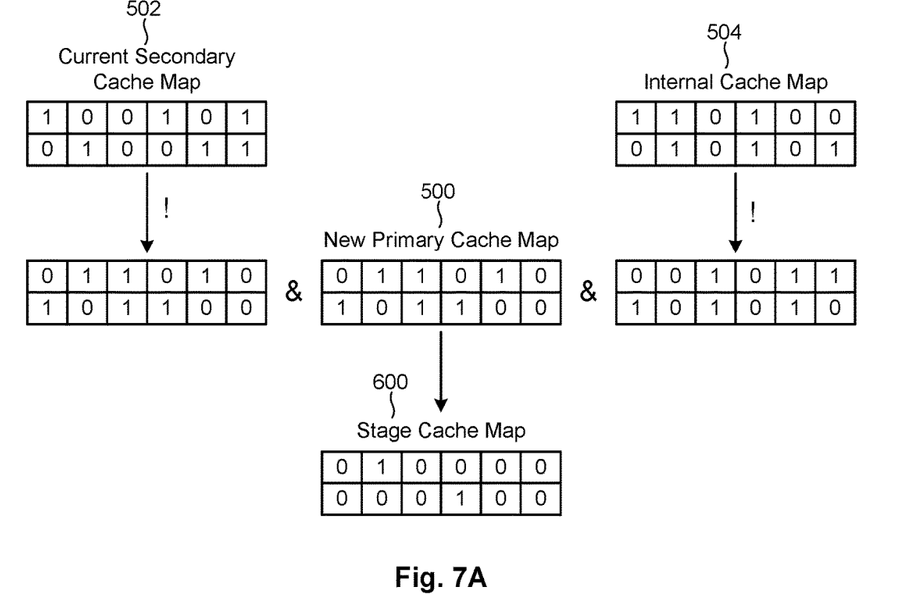
FIG. 7A is a high-level block diagram showing calculation of a stage cache map after initialization of the secondary read cache.

Referring to FIG. 7A, a high-level block diagram, showing calculation of a stage cache map 600 after initialization of the secondary cache 108b, is illustrated. As shown, when a new primary cache map 500 is received from the primary storage device 104a, the secondary storage device 104b ANDs the primary cache map 500 with the inverse of the current secondary cache map 502 and the inverse of the current secondary internal cache map 504. This will yield the stage cache map 600, which indicates which tracks need to be staged from the corresponding secondary volume 102b to the secondary cache 108b. These tracks may then be staged to substantially synchronize the secondary cache 108b with the primary cache 108a (not counting tracks that are maintained in the secondary cache 108b for internal operations).

Figure 7B:
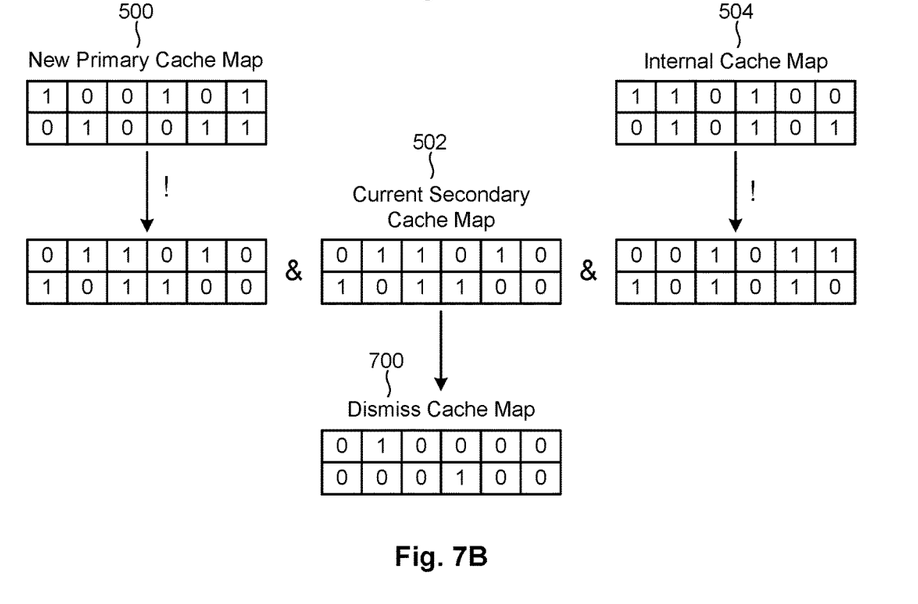
FIG. 7B is a high-level block diagram showing calculation of a dismiss cache map after initialization of the secondary read cache.

Referring to FIG. 7B, a high-level block diagram, showing calculation of a dismiss cache map 700 after initialization of the secondary cache 108b, is illustrated. As the name implies, the dismiss cache map 700 indicates which tracks need to be dismissed from the secondary cache 108b in order to substantially synchronize the secondary cache 108b with the primary cache 108a. As shown, when a new primary cache map 500 is received from the primary storage device 104a, the secondary storage device 104b ANDs the current secondary cache map 502 with the inverse of the new primary cache map 500 and the inverse of the current secondary internal cache map 504. This will yield the dismiss cache map 700, which indicates which tracks need to be dismissed (e.g., evicted and/or destaged) from the secondary cache 108b. Because the secondary storage device 104b ANDs the current secondary cache map 502 with the inverse of the secondary internal cache map 504, the dismiss cache map 700 will prevent dismissing, from the secondary cache 108b, tracks that are used for internal or other operations of the secondary storage device 104b.

Figure 8:
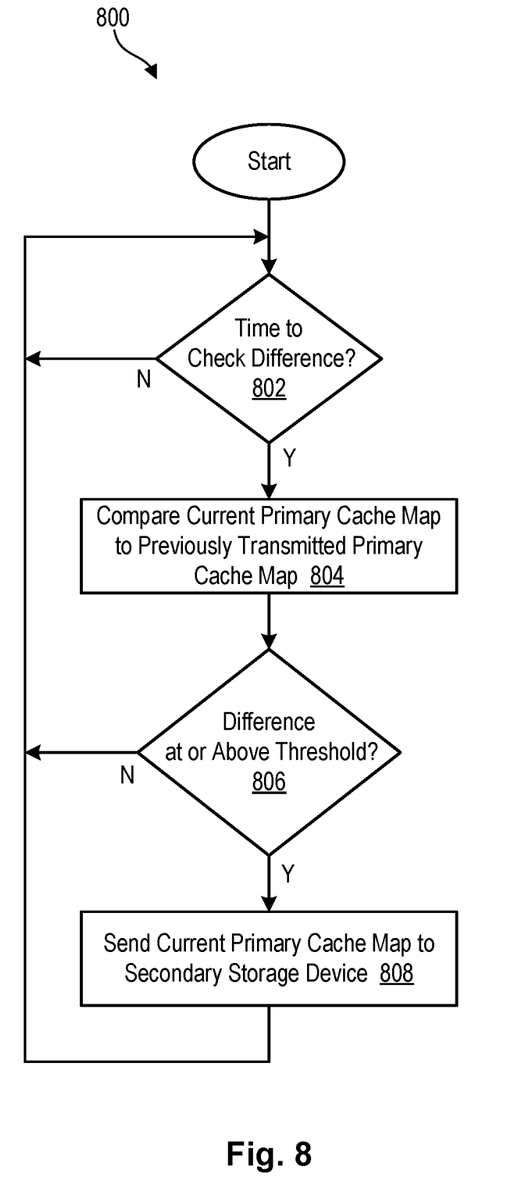
FIG. 8 is a process flow diagram showing one embodiment of method for determining when to transmit a primary cache map from the primary storage device to the secondary storage device.

Referring to FIG. 8, a process flow diagram showing one embodiment of a method 800 for determining when to transmit a primary cache map 500 from the primary storage device 104a to the secondary storage device 104b is illustrated. Such a method 800 may be executed by the primary storage device 104a. As shown, the method 800 determines 802 whether it is time to check a difference between a current primary cache map 500 and a previously transmitted primary cache map 500 (i.e., the difference may be checked periodically). If the time has arrived, the method 800 compares 804 the current primary cache map 500 to the previously transmitted primary cache map 500. Alternatively, the method 800 monitors the difference as changes to the primary cache map 500 occur instead of performing the comparison step 806. If, at step 806, the difference between the current primary cache map 500 and the previously transmitted primary cache map 500 is at or above a designated threshold, the method 800 sends 808 the current primary cache map 500 to the secondary storage device 104b.

Figure 9:
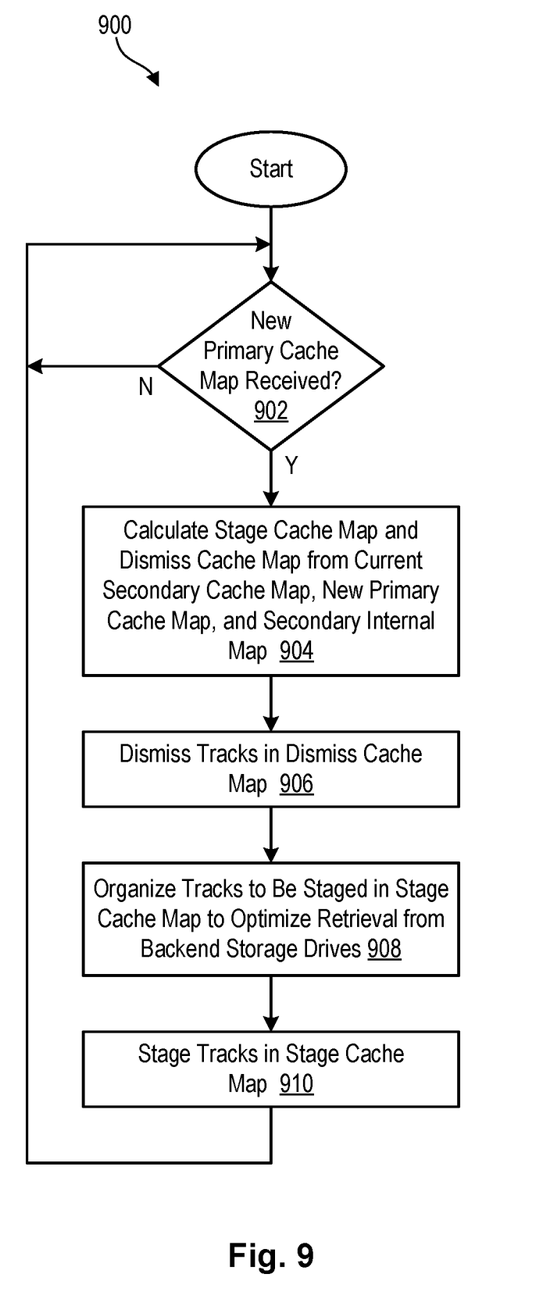
FIG. 9 is a process flow diagram showing one embodiment of method for substantially synchronizing the secondary read cache with the primary reach cache.

Referring to FIG. 9, a process flow diagram, showing one embodiment of a method 900 for substantially synchronizing the secondary cache 108b with the primary cache 108a, is illustrated. Such a method 900 may be executed by the secondary storage device 104b. As shown, the method 900 initially determines 902 whether a new primary cache map 500 has been received. If a new primary cache map 500 has been received, the method 900 calculates 904 the stage cache map 600 and dismiss cache map 700 based on the current secondary cache map 502, the new primary cache map 500, and the secondary internal cache map 504. The method 900 then dismisses 906, from the secondary cache 108b, the tracks identified in the dismiss cache map 700.

At this point, various optimizations may be performed for data that is staged from the secondary volume 102b to the secondary cache 108b. Instead of simply staging tracks that are identified in the stage cache map 600 in any order, the method 900 may organize 908 the tracks to be staged. For example, the tracks may be organized to enable faster parallel retrieval from multiple backend storage drives 204. Alternatively, or additionally, tracks may be organized to be retrieved sequentially from backend storage drives 204, which is typically much faster than random access. In certain embodiments, the stage cache map 600 may be merged with stage cache maps 600 from other secondary volumes 102b to enable coordinated sequential retrieval of data. Once tracks are organized 908 to enable more optimized retrieval, the method 900 may stage 910 the tracks in the optimized order.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to optimize primary and secondary read cache in a data replication environment, the method comprising:
   determining contents of a primary read cache at a primary site;
   updating a primary cache map describing the contents;
   transmitting the primary cache map from the primary site to a secondary site;
   using, at the secondary site, the primary cache map to substantially synchronize a secondary read cache with the primary read cache;
   monitoring updates to the primary read cache and updating the primary cache map to reflect the updates; and
   when a difference between a current primary cache map and a previously transmitted primary cache map reaches a threshold, transmitting the current primary cache map from the primary site to the secondary site.

2. The method of claim 1, wherein the primary cache map is one of a plurality of primary cache maps at the primary site, each primary cache map corresponding to a volume at the primary site.

3. The method of claim 2, wherein the primary cache map is a bitmap.

4. The method of claim 3, wherein the bitmap comprises a bit for each track in the corresponding volume.

5. The method of claim 1, further comprising, upon receiving the primary cache map at the secondary site, consolidating the primary cache map with a secondary cache map to create a stage cache map.

6. The method of claim 5, further comprising staging, to the secondary read cache at the secondary site, tracks identified by the stage cache map.

7. The method of claim 6, further comprising organizing the staging of the tracks to optimize access to backend storage drives.

8. A computer program product to optimize primary and secondary read cache in a data replication environment, the computer program product comprising a computer-readable storage medium having computer-usable program code embodied therein, the computer-usable program code configured to perform the following when executed by at least one processor:
   determine contents of a primary read cache at a primary site;
   update a primary cache map describing the contents;
   transmit the primary cache map from the primary site to a secondary site;
   use, at the secondary site, the primary cache map to substantially synchronize a secondary read cache with the primary read cache;
   monitor updates to the primary read cache and update the primary cache map to reflect the updates; and
   when a difference between a current primary cache map and a previously transmitted primary cache map reaches a threshold, transmit the current primary cache map from the primary site to the secondary site.

9. The computer program product of claim 8, wherein the primary cache map is one of a plurality of primary cache maps at the primary site, each primary cache map corresponding to a volume at the primary site.

10. The computer program product of claim 9, wherein the primary cache map is a bitmap.

11. The computer program product of claim 10, wherein the bitmap comprises a bit for each track in the corresponding volume.

12. The computer program product of claim 8, wherein the computer-usable program code is further configured to, upon receiving the primary cache map at the secondary site, consolidate the primary cache map with a secondary cache map to create a stage cache map.

13. The computer program product of claim 12, wherein the computer-usable program code is further configured to stage, to the secondary read cache at the secondary site, tracks identified by the stage cache map.

14. The computer program product of claim 13, wherein the computer-usable program code is further configured to organize the staging of the tracks to optimize access to backend storage drives.

15. A system for synchronizing primary and secondary read cache in a data replication environment, the system comprising:
    at least one processor;
    at least one memory device coupled to the at least one processor and storing instructions for execution on the at least one processor, the instructions causing the at least one processor to;
    determine contents of a primary read cache at a primary site;
    update a primary cache map describing the contents;
    transmit the primary cache map from the primary site to a secondary site;
    use, at the secondary site, the primary cache map to substantially synchronize a secondary read cache with the primary read cache;
    monitor updates to the primary read cache and update the primary cache map to reflect the updates; and
    when a difference between a current primary cache map and a previously transmitted primary cache map reaches a threshold, transmit the current primary cache map from the primary site to the secondary site.

16. The system of claim 15, wherein the primary cache map is one of a plurality of primary cache maps at the primary site, each primary cache map corresponding to a volume at the primary site.

17. The system of claim 16, wherein the primary cache map is a bitmap.

18. The system of claim 17, wherein the bitmap comprises a bit for each track in the corresponding volume.

19. The system of claim 15, wherein the instructions further cause the at least one processor to, upon receiving the primary cache map at the secondary site, consolidate the primary cache map with a secondary cache map to create a stage cache map.

20. The system of claim 19, wherein the instructions further cause the at least one processor to stage, to the secondary read cache at the secondary site, tracks identified by the stage cache map.

* * * * *